No. 701,137. Patented May 27, 1902.
W. F. BOSSERT.
INTERIOR CONDUIT OUTLET BOX.
(Application filed Mar. 25, 1902.)
(No Model.)
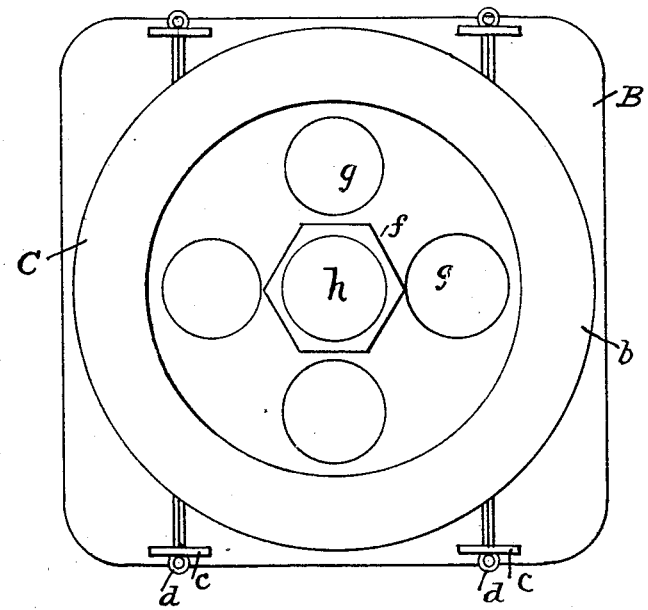
Fig. 1.
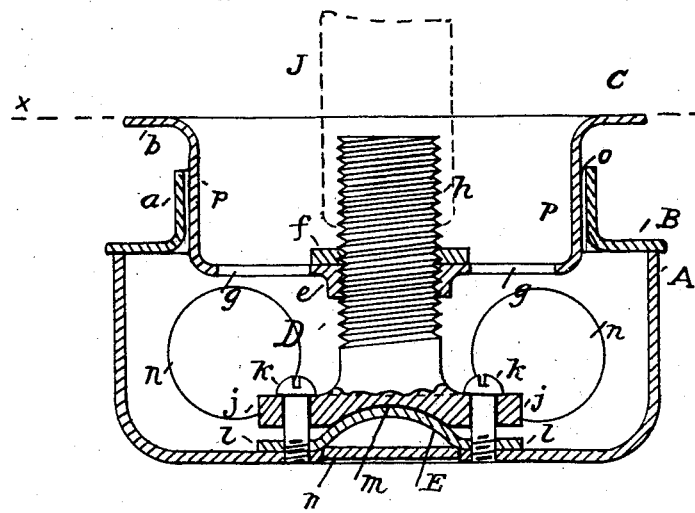
Fig. 2.
WITNESSES: Fig. 3.
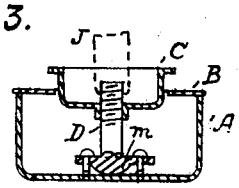
INVENTOR.
William F. Bossert
BY Geo. Willis Pierce
ATTORNEY.
THE NORRIS PETERS CO., PHOTO-LITHO., WASHINGTON, D. C.

UNITED STATES PATENT OFFICE.

WILLIAM F. BOSSERT, OF UTICA, NEW YORK, ASSIGNOR TO THE BOSSERT ELECTRIC CONSTRUCTION COMPANY, OF UTICA, NEW YORK.

INTERIOR-CONDUIT OUTLET-BOX.

SPECIFICATION forming part of Letters Patent No. 701,137, dated May 27, 1902.

Application filed March 25, 1902. Serial No. 99,869. (No model.)

*To all whom it may concern:*

Be it known that I, WILLIAM F. BOSSERT, residing at Utica, in the county of Oneida and State of New York, have invented certain Improvements in Interior-Conduit Outlet-Boxes, of which the following is a specification.

This invention relates to metal boxes employed in connection with the systems of interior conduits arranged in modern buildings for the conveyance of insulated conductors to the various parts of the building to the translating devices utilizing the electric current, such as electric lamps, motors, &c. In such installations the boxes are employed for a variety of purposes, such as switches, push-buttons, and electric-light fixtures.

The invention has especial reference to metal boxes to which conductors are run for the purposes of connection with electric lamps, such as wall and ceiling lamps. In such boxes there is supported an electric-lamp support or bracket whose base is secured to the inner surface of the wall of the box, either the side or the bottom wall, and near the opening in the box-cover the bracket terminates in a screw-threaded stud or boss, upon which the lamp-fixture is screwed. As the boxes are secured within the walls or partitions before the stucco or plaster is put upon the walls or the lathing, it is frequently found that the face of the box is not in line with the face of the wall after the same is plastered and finished. Consequently the lamp-fixture stands awry with the face of the wall and presents a staggered appearance, which is very unsightly.

The object of the invention is to provide means for remedying the non-alinement of the box with the finished wall and whereby the lamp-bracket may be adjusted to a true angle with the wall, as I will now proceed to describe and claim.

Of the accompanying drawings, Figure 1 is a top view of the invention. Fig. 2 is a cross-section of the previous figure, and Fig. 3 is a section of a modification.

I prefer to describe the invention as applied to a conduit-box struck up from a piece of malleable metal; but it is applicable to boxes made of cast metal also.

In the drawings, A is a sheet-metal box struck up in dies in a manner well understood, and B is a cover adapted to be locked to the box by the cotter-pins $d$, extending through the ears $c$ of the box, which project through holes in the cover. The cover ordinarily has a collar $a$ standing up around the central orifice $o$ therein.

D is a lamp support or bracket, having a screw-threaded stud or boss $h$ at its upper part, while its lower part terminates in three or more arms $j$, spreading out, as shown. In each arm is a hole through which extends a bolt $k$, having a slotted head. The lower face $m$ of the bracket is hollow or concave and rests upon a plate E, having a convexed upper surface, also provided with arms $l$, through which the bolts $k$ extend and are then threaded into the bottom wall of the box. The arms $j$ of the bracket are separated from the arms $l$ of the plate by a space in order that the bracket may be tilted over in any direction and secured firmly by the bolts $k$. This portion of the drawings is more fully described in an application for patent filed by me March 19, 1902, Serial No. 99,014.

C is a dish-shaped outer metal portion located in the orifice $o$ of the cover B, struck up from a piece of sheet metal, and has an outwardly-extending rim $b$, and its bottom is perforated by the holes $g$. A hole punched in the center of the bottom is enlarged by forcing outwardly the metal around the hole to form a lug $e$, the interior of which is screw-threaded. It is of course not necessary to describe in detail the exact sequence of the several manipulations for producing the inner and outer box portions A and C, as they will be readily understood by those familiar with the art. The walls $p$ of the part C are made smaller in diameter than the internal diameter of the collar $a$ of the cover B, so that the outer portion C may rock back and forth therein to a slight degree. The stud $e$ of the part C is screwed down the boss $h$ a suitable distance and is followed by the clamp or binding-nut $f$. The box A and its cover B are secured within a wall or partition, and conduits are entered through holes in the side or bottom of the box in a common and usual manner, and the stucco or plaster is applied to the walls or lathing of the wall, whose finished surface is indicated by the dotted line x x. The lamp-fixture bracket D may then be secured in the box A and the part C screwed onto the boss h. If the upper surface of the part C should not be in line with the face of the plaster x x, any fixture, as J in dotted lines, screwed onto the boss h, would not present a true appearance, and to adjust the face of the part C with the wall a screw-driver is extended through the holes g and the bolts k loosened, so that the part C can be tilted about, the outer box portion and the support D rolling upon the curved plate E, and when the alinement is found the screws are tightened up.

In this case, as in the application referred to, various modifications of the curved surfaces m and the contiguous surface of the plate E may be made, and Fig. 3 shows a modification in the device for varying the angle of the outer box portion C with the inner box portion A. In this case the curved surface m is located upon the end of the support or bracket D, and it is supported upon the upper surface of the bottom wall of the box portion A, the bolts k securing the parts together. The box portion C is thus carried by the support D and is adjusted toward the inner box part A by turning the same up or down the screw-head or bolt h, which also serves to hold the lamp-fixture J, and the said outer box portion C is directly and positively supported by the part D, which is bolted to the bottom of the inner box portion A, from which point the angular adjustment of the outer box to the inner box is made. There is a decided advantage in the adjustment of the alinement from the bottom of the box A, for a very slight movement of the bearing-surfaces there produces a large variation of angle of the outer face of the portion C, and the adjustment is very easily and quickly performed.

I claim as my invention—

1. An interior-conduit box composed of an inner box portion to which the conduits are attached, provided with a cover having a central orifice; an outer box portion of less diameter than the orifice of the cover, and located therein, with a screw-threaded lug in the center of its bottom wall; with means for directly and positively supporting the said outer box portion from the bottom of the inner box portion, and means for adjusting the distance of one box portion to the other, and means also for adjusting the relative angle of one box portion to the other, as set forth.

2. An interior-conduit box, composed of an inner box portion provided with a cover having a central orifice; an outer box portion of less diameter than the orifice of the cover and located therein, having an outer rim and a screw-threaded lug in the center of its bottom wall, and other openings in said wall as described; with means for directly and positively supporting the said outer box portion from the bottom of the inner box portion, and means for adjusting the box portions toward one another and means also for adjusting the relative angle of the outer box portion to the inner portion, as set forth.

3. An interior-conduit box composed of an inner box portion to which the conduits enter; a lamp-fixture support provided with a screw-threaded stud whose inner end has a supporting-surface adjustably held to a second surface in the bottom of the said inner box portion; a cover secured to said inner portion, having a central orifice; an outer box portion within the central orifice of the cover and adjustably supported upon the said threaded stud; with means at the bottom of said fixture-support for adjusting the said support and outer box portion at any angle.

4. An interior-conduit box composed of an inner box portion to which the conduits are attached; a cover for the said box portion having a central orifice; an outer box portion adapted to enter the said cover-orifice freely, having a threaded lug in the center of its bottom; with means for adjustably supporting the said outer box portion to and from the said cover, and for tilting the same universally at any angle, consisting of an upright support whose outer end is screw-threaded and engaging the said threaded lug of the outer box portion, the support also adapted to sustain a lamp-fixture, the inner end of the support provided with adjustable means for holding the same tilted from the bottom wall of the inner box portion.

5. An interior-conduit box composed of an inner portion to which the conduits enter; a cover for the said inner portion, provided with a central orifice; an outer portion with substantially upright walls terminating in an outward rim, a screw nut or lug in the center of the bottom wall, which is also otherwise perforated as described; with a lamp-fixture support whose inner end has a supporting-surface adjustably held to a second surface in the bottom of the inner box portion and adapted to rotate thereupon, the outer end of said support consisting of a screw-threaded stud passing through and engaging with the said screw thread or lug, and a set-nut upon the upper side of said lug.

6. An interior-conduit box composed of an inner portion to which the conduits enter; a cover for the said inner portion, having a central orifice; and an outer portion provided with a screw-lug in the center of its bottom wall; with a lamp-fixture support having a screw-threaded stud projecting through and engaging said screw-lug, and whose inner end has a curved supporting-surface adjustably held to a second surface in the bottom of the said inner portion, whereby the said outer portion may be raised and lowered upon the said stud, and be angularly adjusted relatively to the said inner box portion by the movement of the said curved surface upon the second surface, as set forth.

In testimony whereof I have signed my name to this specification, in the presence of two subscribing witnesses, this 22d day of March, 1902.

WILLIAM F. BOSSERT.

Witnesses:
WM. H. MATTEN,
WM. H. GRAY.